April 12, 1949.  C. J. DAVIS ET AL  2,466,878
SWEEP RAKE AND STACKER
Filed June 20, 1945  3 Sheets-Sheet 1
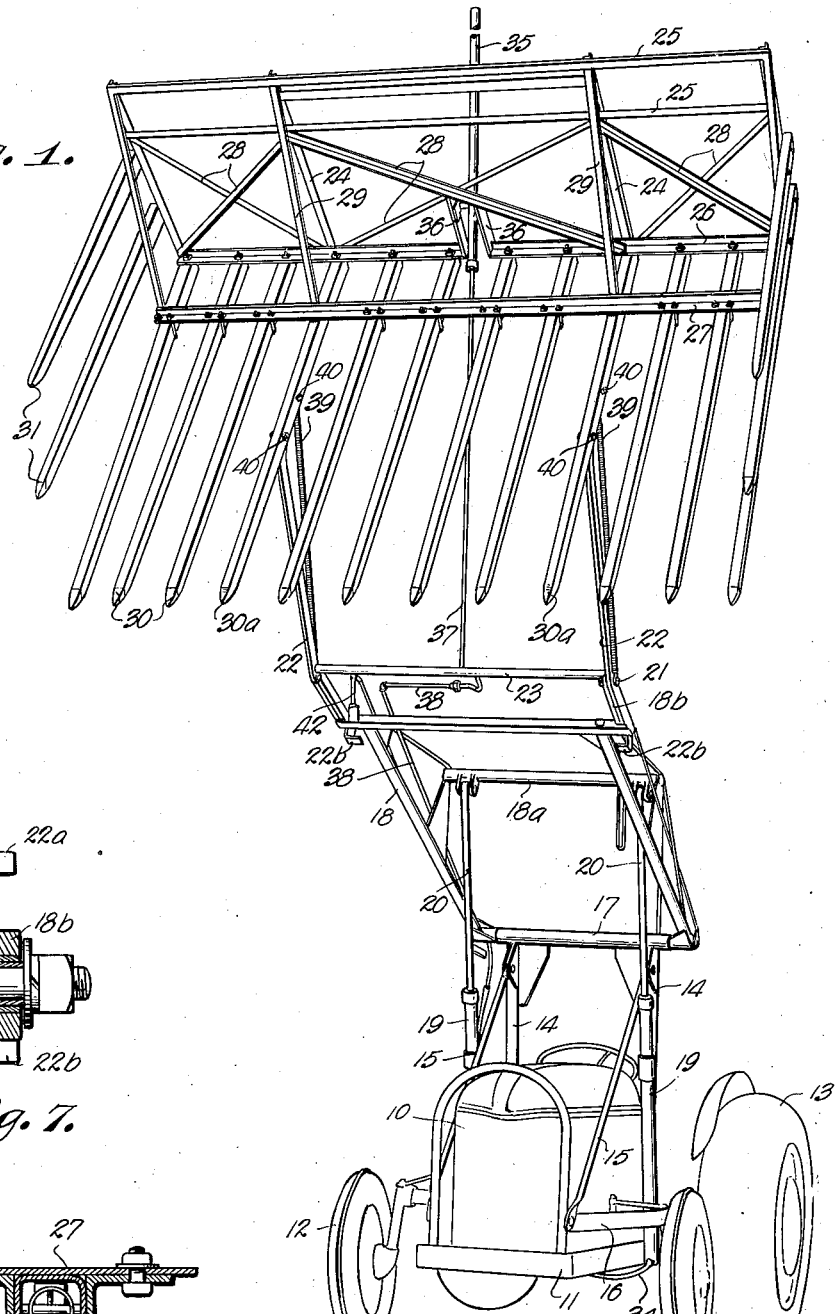
Fig. 1.
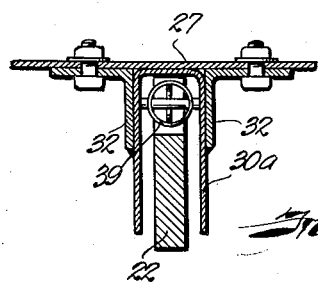
Fig. 7.
Fig. 8.
INVENTORS.
Charles J. Davis
Loyd R. Westholt
John I. Michaels
BY
ATTORNEY

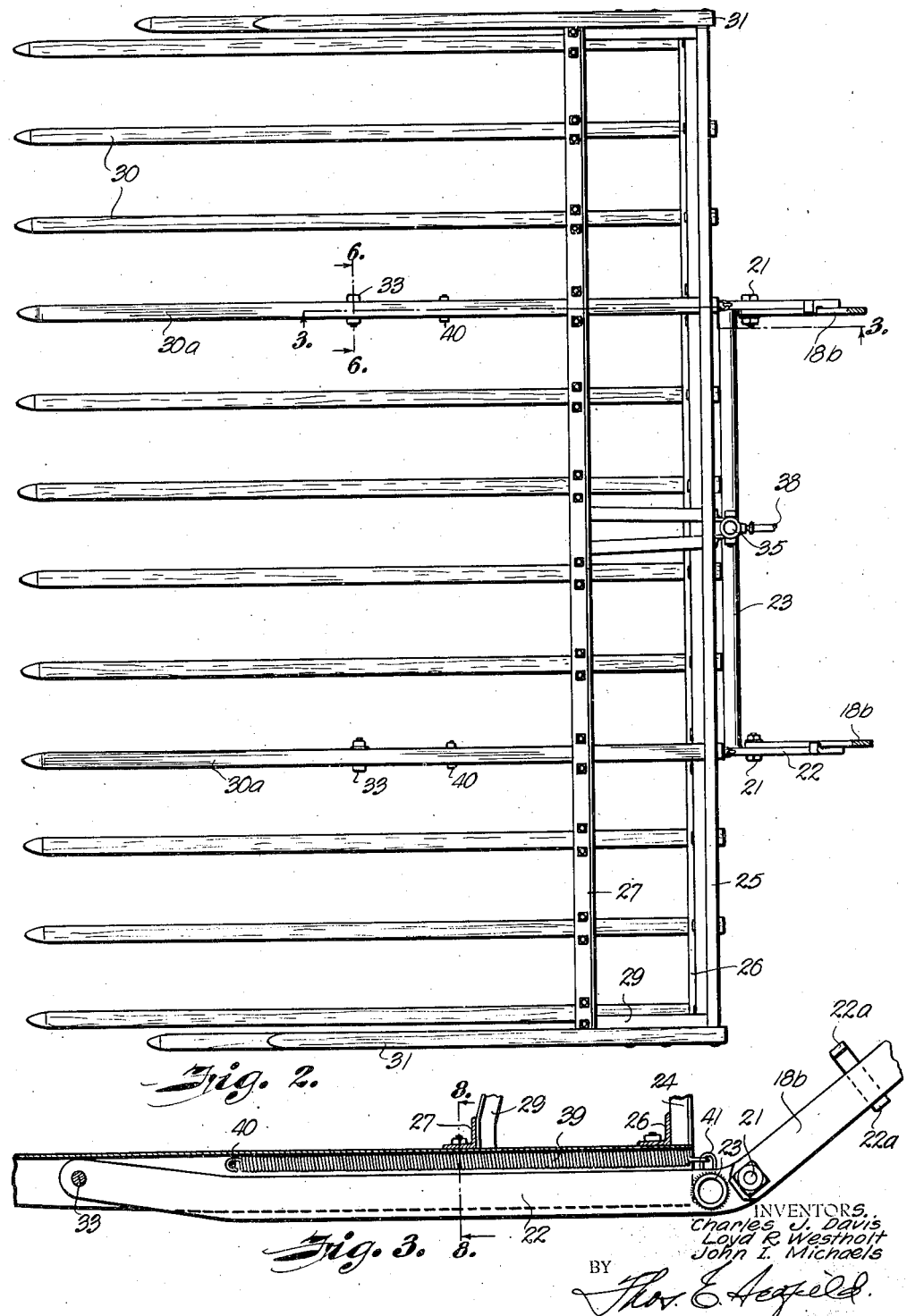

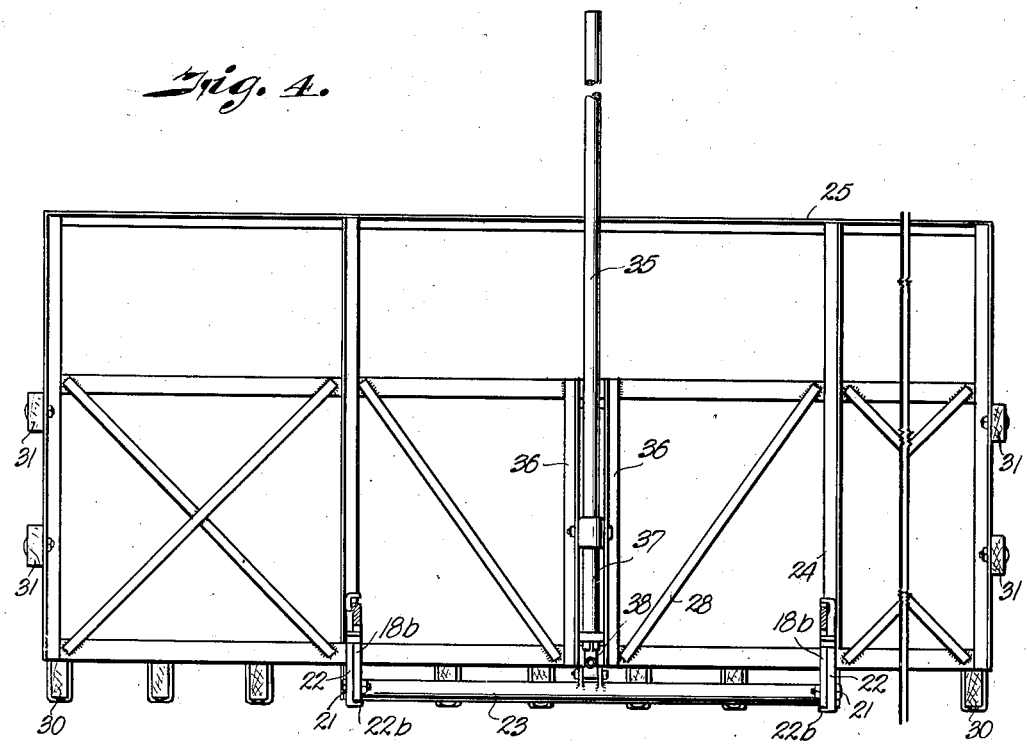
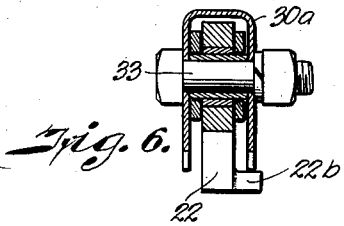
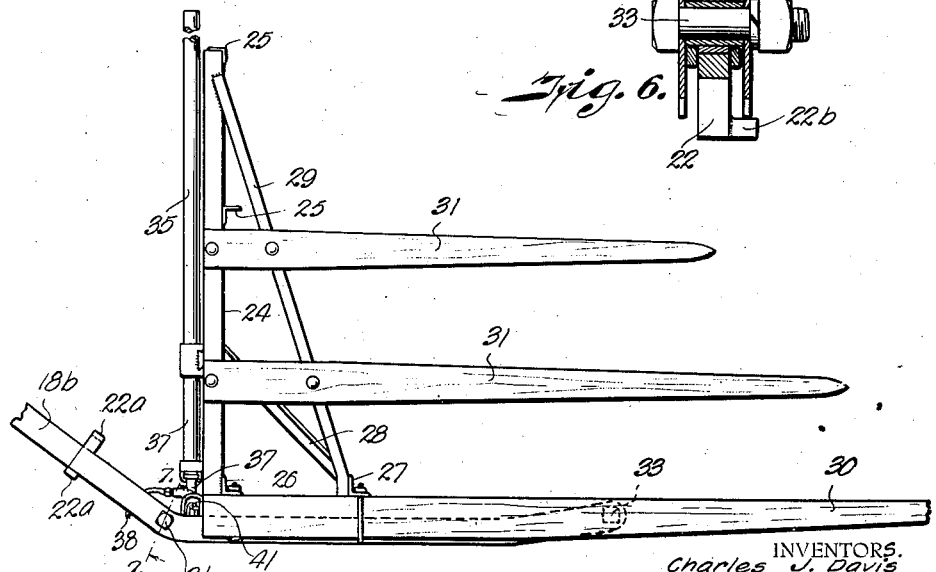

Patented Apr. 12, 1949

2,466,878

UNITED STATES PATENT OFFICE 2,466,878

SWEEP RAKE AND STACKER

Charles J. Davis, Loyd R. Westholt, and John I. Michaels, Wichita, Kans.

Application June 20, 1945, Serial No. 600,438

11 Claims. (Cl. 214—140)

This invention relates to improvements in a pickup and stacking device and refers more particularly to a mechanism for mounting on a tractor to gather and stack hay, alfalfa, peas, beans and other legumes and forage crops prior to threshing. For the explanation of the device there has been selected what is known as a sweep rake and stacker. The mechanism is serviceable also for picking up, conveying and stacking baled, bagged, boxed or packaged commodities such as fruit and vegetables. The apparatus is preferably mounted upon a conventional type tractor equipped with a hydraulic system such as that manufactured by the Ford Motor Company.

The features of salient novelty reside in the flexible support or mounting of the rake in front of the tractor when used as a sweep rake and in the manner in which the rake is elevated and dumped during the stacking operation.

It is recognized that a combined sweep rake and stacker or other type of pickup devices, such as shovels, forks or scoops have been heretofore mounted upon tractors employing mechanical or hydraulic lifting mechanism for raising and dumping the pickup attachment. It is believed novel, however, to pivot a rake centrally of its tines on an elevated frame which forms its support and by a separate hydraulically actuated lift raise and dump the rake while elevated above its supporting frame.

An object of the invention, therefore, is to provide a pickup and dumping device adapted to be mounted upon the frame of a tractor which can be used both as a sweep rake and stacker.

Another object is to provide a sweep rake and stacking device whose elevating and dumping mechanisms are operated from the hydraulic system of the tractor upon which it is mounted.

A further object is to provide a sweep rake which is flexibly mounted on the tractor frame accommodating itself as it moves over the ground before the tractor to rough contour of the surface thereby reducing strains and stresses upon the mechanism and reducing likelihood of damage to its parts.

Another object is to provide a pickup and stacking device which has separately operated lifts, one to raise the rake supporting frame and the other to further lift and dump the rake after it has been elevated by the frame.

Other and further objects will appear from the following description. In the accompanying drawings which form a part of the instant specification and are to be read in conjunction therewith and in which like reference numerals are used to indicate like parts in the various views, Fig. 1 is a front perspective view of the device in a raised position, Fig. 2 is a plan view of the rake portion of the device, Fig. 3 is a view taken along the line 3—3 in Fig. 2 in the direction of the arrows, Fig. 4 is a rear view of the rake showing the auxiliary hydraulic lift and dumping mechanism, Fig. 5 is a side view of the rake, Fig. 6 is a view taken along the line 6—6 in Fig. 2 in the direction of the arrows, Fig. 7 is a view taken along the line 7—7 in Fig. 5 in the direction of the arrows, and Fig. 8 is a view taken along the line 8—8 in Fig. 3 in the direction of the arrows.

Referring to the drawings and particularly to Fig. 1, at 10 is shown diagrammatically the radiator and hood surrounding the engine of a tractor. The frame 11 is carried by front wheels 12 and rear wheels 13. The tractor shown is of the Ford-Ferguson type equipped with a hydraulic system located beneath and built in as an integral part of the engine. Mounted upon the tractor frame are uprights 14 held in position by diagonal stanchions or braces 15 and lower horizontal frame members 16. Pivoted on the uprights 14 at cross bar 17 is a rake supporting frame 18. Mounted on the tractor frame are two hydraulic cylinders 19 whose pistons 20 are attached at their upper ends to a transverse bar 18a of the frame 18. In a lowered position the side members of the frame 18 are substantially parallel to the stanchion 15 while the rake extends from the front of the tractor with its teeth or tines 4 to 8 inches above the ground level. From the front of frame 18 extend arm supports 18b to which are pivoted at 21 the lift arms 22. A spacer tube 23 between the lift arm is located adjacent pivot 21.

The back of the sweep rake consists of vertical members 24, horizontal transverse members 25, and lower horizontal members 26 and 27 held together and braced by diagonal supports 28 and 29. The bottom teeth or tines 30 are formed preferably of hard tough wood and are carried by the lower transverse members 26 and 27 while the side teeth 31 are attached to vertical members 24 and diagonal braces 29. Two of the teeth 30a are of metal construction having the form of inverted channels. These teeth or tines are held in position by angles 32 which are bolted to the lower transverse member 27 shown in cross section in Fig. 8. The front ends of the lift arms 22 are pivoted centrally beneath the channel-shaped teeth 30a at 33, as shown in Figs. 3 and 5. The rear ends of the lift arms extend beyond pivots 21 and terminate in laterally extending flange members 22a, shown in Figs. 3 and 5. The flanges abut supports 18b and permit a limited vertical movement of the lift arms on pivots 21. Since the rake is supported on the lift arms the limited movement permitted by the flanges accommodates the rake to unevenness in the surface of the ground over which the tractor and rake are passing when the rake is in a lowered position.

The hydraulic mechanism comprising cylinders 19 and pistons 20 which form the lifting arrangement for frame 18 are connected by a flexible hose connection 34 through a control valve, not shown, to the hydraulic system of the tractor. The secondary rake lifting and dumping mechanism comprises a hydraulic cylinder 35 pivoted between vertical supports 36 in the back of the rake. Operating in cylinder 35 and attached at its lower end by lugs to cross member or spacer bar 23 is a hollow piston 37, shown in Figs. 1, 2, 4 and 5. Piston 37 is likewise connected through piping 38 to a control valve near the operator's seat, not shown. The control for directing hydraulic fluid from the tractor hydraulic system to cylinders 19 and 35 may be a single rotary valve operated by a single lever or separate valves. In either event, separate controls must be provided to operate the frame lifting mechanism and the auxiliary or supplementary rake lifting and dumping mechanism as entirely separate units.

Within the inverted channel-shaped teeth above the lift arms are coil springs 39 attached at their forward ends to the teeth at pins 40. The rear or opposite ends of the springs hook into eyes 41 on top of lift arms 22 substantially above the axis of spacer tube 23. Extending inwardly from the lower edges of both lift arms 22 are lugs 22b, shown in Figs. 4 and 6, against which the inner flanges of the channelled teeth abut when in a lowered position. These lugs 22b and pivots 21 support the rake on the lift arm while flanges 22a at the rear ends of the arms give the teeth of the rake a limited vertical movement on pivot 21 when in a lowered position and used as a sweep rake.

As previously suggested, when used as a sweep rake the teeth extend forwardly from the tractor substantially parallel with the ground level and a few inches thereabove. In this position forage crops and small grain as well as peas and beans or baled and bagged commodities can be picked up and transported. When it is desired to stack or pile the crops or commodities the control handle is operated to introduce hydraulic fluid under pressure from the tractor hydraulic system into the bottoms of cylinders 19. Pistons 20 are forced upwardly exerting an upward force evenly and at opposite ends of cross bar 18a. This cross bar being a part of the frame rotates the frame upon its pivot 17. During this movement of the frame the rake is supported upon and held in position on the frame by lift arms 22 pivoted at the extending ends of frame arms 18b. A latching mechanism diagrammatically shown at 42 in Fig. 1 is used when a scoop bucket or utility fork is substituted for the sweep rake.

To operate the supplemental rake lifting and dumping mechanism the valve controlling the flow of hydraulic fluid is manipulated to introduce fluid from the tractor hydraulic system through pipe 38 into the hollow piston 37. The fluid flowing through the hollow piston exerts energy against the top of the cylinder since in this mechanism the position of the cylinder is reversed, being above instead of below the piston. As the cylinder 35 is attached to the back of the rake its rear end is raised, and the rake as a whole being pivoted centrally of its teeth at 33.

In Fig. 1 the rake is shown at its extreme upward elevation. It will be noted that frame 18 has been elevated upon its pivot 17 to an angle of 30° or more above a horizontal position. Lift arms 22 pivoted to frame arms 18b at the front of the frame 18 extend upwardly at an angle from the frame. At the ends of the lift arms at pivots 33 located centrally of the channelled teeth of the rake are the pivots for further elevating and dumping the rake. By locating these pivots thusly, elevation of the back of the rake by the auxiliary or supplementary hydraulic cylinder 35 raises it first to a horizontal position and further elevation dumps its contents. Were the rake pivoted, as is usual, along its bottom rear edge the additional elevation acquired by pivoting the rake centrally of the teeth could not be obtained. In other words, if the rake were pivoted at the rear ends of the teeth or at the back when dumped the extreme height to which it could be elevated would be along its pivot. By supporting the rake centrally of the tines and attaching the elevating mechanism to the back of the rake the dumping operation increases its elevation and permits its contents to be piled or stacked to a greater height.

To lower the rake the control valve for the upper elevating hydraulic mechanism is actuated to permit draining back of the hydraulic fluid into the low pressure chamber of the tractor system. Coil springs 39 put under tension during elevation of the rake now return the rake to rest upon the lift arms, as shown in Figs. 3, 4, and 5. Piston 37 will be telescoped into cylinder 35 and the rake will rest upon and be supported by frame arms 18a and lift arms 22. When in this position the lift arms are in position beneath the channelled teeth, shown in Figs. 2 to 6 inclusive. After the rake has been lowered to rest upon the frame lift arms the control valve, which admits hydraulic fluid to cylinders 19, is operated permitting discharge of hydraulic fluid from the cylinders back into the low pressure chamber of the tractor system. With the release of pressure upon the hydraulic fluid pistons 20 are retracted in their cylinders pivoting the frame and rake to a lowered position. By the control valve or valves, which separately charge and discharge hydraulic fluid to the frame lifting and rake elevating mechanisms, elevation of the rake and its position with respect to the tractor may be accurately adjusted at the will of the operator.

From the foregoing it will be seen that the objects of the invention have been accomplished. There has been provided a sweep rake and stacker flexibly pivoted from the frame of a tractor when in a lowered position. The flexible mounting of the rake on the frame permits the rake to accommodate itself to rough or uneven terrain over which it is operated with less likelihood of damage due to vibration, jarring and collision with obstructions. The separately operated hydraulic frame and rake elevating mechanisms permit the rake to be raised to any desired height between the lowered position and the extreme elevated position. By pivoting the rake centrally of its tines and attaching the hydraulic elevator at the rear of the rake an increased height or elevation is attained.

It is contemplated that the two hydraulic elevating mechanisms may be operated from a single rotary control valve or from separate valves interposed in the two systems. As previously indicated, both hydraulic elevating mechanisms are operated from the tractor hydraulic system built in as a part of the tractor, as in the Fordson tractor, or added as an accessory to the tractor. The details of the hydraulic system, the control valve mechanisms and the latching device for holding the rake in position on the frame arms have been omitted from the drawings or shown very diagrammatically in the interest of simplicity.

It will be seen that the invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having thus described our invention, we claim:

1. A sweep rake and stacker operated in conjunction with a power driven tractor having a hydraulic system comprising uprights mounted on the tractor, a frame pivoted upon the uprights, a frame lifting mechanism connected to the tractor hydraulic system for raising and lowering the frame upon its pivot, lift arms attached to the frame, a sweep rake hinged to said arms for rotation about an axis central of the tines, a rake lifting and dumping mechanism also connected to the tractor hydraulic system mounted on the tractor, said lifting and dumping mechanism comprising an inverted hydraulic cylinder attached to the sweep rake, a hollow piston within the cylinder pivoted at its lower extremity on the frame and springs for returning the rake to normal position after dumping, and control means operating the frame and rake actuating mechanisms.

2. A sweep rake and stacker as in claim 1 wherein the control means is adapted to separately operate the frame and rake actuating mechanisms.

3. A device as in claim 1 in which the sweep rake is replaced by a pickup device of the class including a shovel or scoop.

4. A pickup device operated in conjunction with a power driven tractor comprising uprights mounted on the tractor, a frame pivoted upon the uprights, frame arms extending forwardly of the frame in rigid relationship thereto, a pickup attachment, lift arms pivoted to the frame arms and to the pickup attachment, limiting means coacting with the frame and lift arms permitting limited oscillation of the lift arms relative to the frame to accommodate and compensate for sudden strains and stresses imposed upon the pickup attachment supports by unevenness of the terrain.

5. A device as in claim 4 in which the pickup attachment is a sweep rake.

6. A device as in claim 4 in which the limiting means comprises flanges at the extremities of the lift arms loosely embracing the frame arms rearwardly of where they are pivoted.

7. A tractor-carried pickup device comprising an upright support mounted on the tractor, a boom hinged at one end to the top of said support, apparatus operable to raise and lower the free end of said boom, a load-carrying attachment fulcrumed at a point approximately midway between its front and rear to the free end of said boom, and a hydraulic ram operable to pivot said load-carrying attachment about its fulcrum, said ram comprising an inverted cylinder connected to the rear of said load-carrying attachment and a hollow piston within the cylinder connected to said boom adjacent the rear of said attachment.

8. A tractor-carried pickup device comprising an upright support mounted on the tractor, a boom hinged at one end to the top of said support, apparatus operable to raise and lower the free end of said boom, a boom extension pivotally supported on the free end of said boom, stop means restricting the rotation of said extension with respect to said boom and maintaining the two in such angular relationship that said extension is substantially horizontal whenever said boom is inclined obliquely downward toward the ground, and a load-carrying attachment fulcrumed at a point approximately midway between its front and rear to the free end of said extension.

9. A tractor-carried pickup device comprising an upright support mounted on the tractor, a boom hinged at one end to the top of said support, a pair of spaced-apart arms extending from the free end of said boom parallel to one another, and a sweep rake having a pair of tines each pivoted at approximately its mid point to the free end of a corresponding one of said arms, whereby said rake is carried by said arms.

10. A tractor-carried pickup device as claimed in claim 9 wherein each of said tines has a recess extending at least half the length of said tine for receiving the arm to which that tine is pivoted.

11. A tractor-carried pickup device comprising an upright support mounted on the tractor, a boom hinged at one end to the top of said support, a pair of spaced-apart arms extending from the free end of said boom parallel to one another, a crosspiece between said arms, a sweep rake having a pair of tines each pivoted at approximately its mid point to a free end of a corresponding one of said arms, whereby said rake is carried by said arms, and a hydraulic ram operable to rotate said sweep rake about its pivot, said ram having one end connected to the rear of said sweep rake and the other end connected to said crosspiece.

CHARLES J. DAVIS.
LOYD R. WESTHOLT.
JOHN I. MICHAELS.

REFERENCES CITED

The following references are of record in the file of this patent:

UNITED STATES PATENTS

| Number | Name | Date |
| --- | --- | --- |
| 1,504,427 | Butler | Aug. 12, 1924 |
| 1,547,773 | Pearson | July 28, 1925 |
| 2,242,860 | Huelle | May 20, 1941 |
| 2,295,917 | Schwan | Sept. 15, 1942 |
| 2,300,731 | Knarreborg | Nov. 3, 1942 |
| 2,319,921 | Dooley et al. | May 25, 1943 |
| 2,338,361 | Shinn | Jan. 4, 1944 |
| 2,348,899 | Guignard et al. | May 16, 1944 |
| 2,349,335 | Baldwin | May 23, 1944 |
| 2,385,512 | Heath | Sept. 25, 1945 |
| 2,398,119 | Sauder | April 9, 1946 |
| 2,413,097 | Barker | Dec. 24, 1946 |